United States Patent
Huda et al.

(10) Patent No.: US 9,446,336 B2
(45) Date of Patent: Sep. 20, 2016

(54) DUAL CARTRIDGE FILTER STABILIZER

(71) Applicant: KX Technologies LLC, West Haven, CT (US)

(72) Inventors: Stephen P. Huda, Shelton, CT (US); Steven J. Haehn, Oakdale, MN (US); Michael J. Sherman, Woodbury, MN (US)

(73) Assignee: KX TECHNOLOGIES LLC, West Haven, CT (US)

( * ) Notice: Subject to any disclaimer, the term of this patent is extended or adjusted under 35 U.S.C. 154(b) by 208 days.

(21) Appl. No.: 14/165,665

(22) Filed: Jan. 28, 2014

(65) Prior Publication Data

US 2014/0217003 A1 Aug. 7, 2014

Related U.S. Application Data

(60) Provisional application No. 61/761,498, filed on Feb. 6, 2013.

(51) Int. Cl.
*B01D 35/30* (2006.01)

(52) U.S. Cl.
CPC ........... *B01D 35/306* (2013.01); *B01D 35/303* (2013.01); *B01D 35/301* (2013.01); *B01D 2201/4023* (2013.01); *B01D 2201/4038* (2013.01); *B01D 2201/4084* (2013.01)

(58) Field of Classification Search
None
See application file for complete search history.

(56) References Cited

U.S. PATENT DOCUMENTS

| | | | |
|---|---|---|---|
| 4,541,926 A * | 9/1985 | Stanley | B01J 47/002 210/284 |
| 5,700,371 A | 12/1997 | Koslow | |
| 5,895,570 A * | 4/1999 | Liang | B01D 35/12 210/232 |
| RE37,216 E | 6/2001 | Koslow | |
| 6,379,560 B1 * | 4/2002 | Tilp | B01D 35/303 210/195.1 |
| 6,497,817 B1 * | 12/2002 | Liang | B01D 35/12 210/232 |
| 7,067,054 B2 | 6/2006 | Fritze | |
| 7,909,999 B2 | 3/2011 | Noh et al. | |
| D656,579 S | 3/2012 | Sherman et al. | |
| 2009/0308799 A1 | 12/2009 | Cho | |

FOREIGN PATENT DOCUMENTS

| | | |
|---|---|---|
| JP | 06-003408 | 1/1994 |
| WO | WO 2010-095795 | 8/2010 |
| WO | WO 2013-138287 | 9/2013 |

* cited by examiner

*Primary Examiner* — Benjamin Kurtz
(74) *Attorney, Agent, or Firm* — Robert Curcio; DeLio, Peterson & Curcio, LLC

(57) ABSTRACT

A stabilizer for suppressing vibration, shock, translational, and rotational forces, on a dual cartridge filter system. The stabilizer uses opposing curved surfaces which correspond with, and follow the curvature of, the diameter of each cartridge cylindrical housing. The stabilizer is formed having a stabilizer base with locking members or leg portions radially extending along a bottom portion of each opposing curved surface. The stabilizer is secured to each filter housing by having the locking members inserted within indents on a rim of the filter housing bottom end cap. In alternative embodiments, the locking member is a resilient tab that forms a friction fit with a complementary structure on the filter housing bottom end cap, or an interlocking snap-fit male/female clip complementary to a female/male clip or snap on the filter housing lower cap.

14 Claims, 6 Drawing Sheets

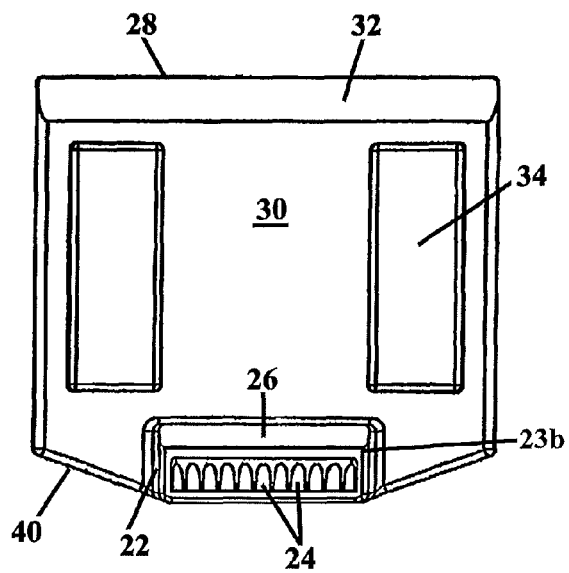
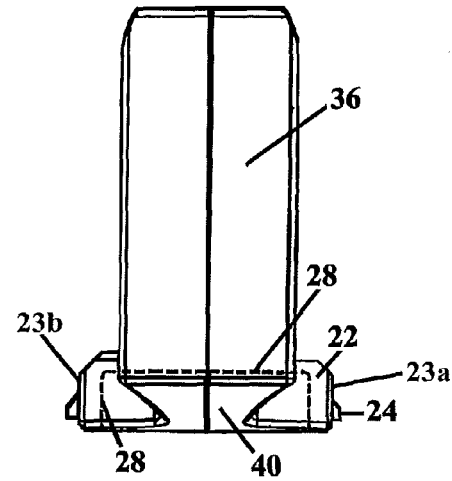
FIG. 8
FIG. 9
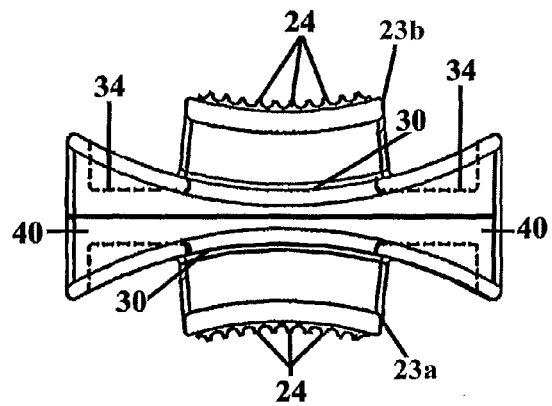
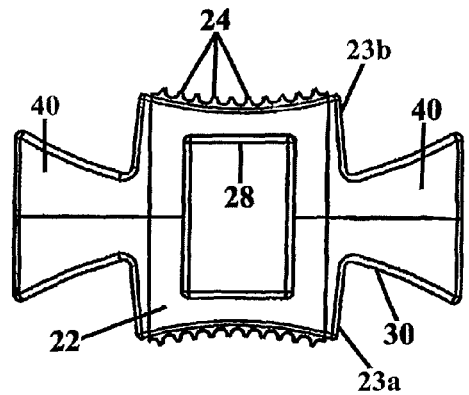
FIG. 10
FIG. 11

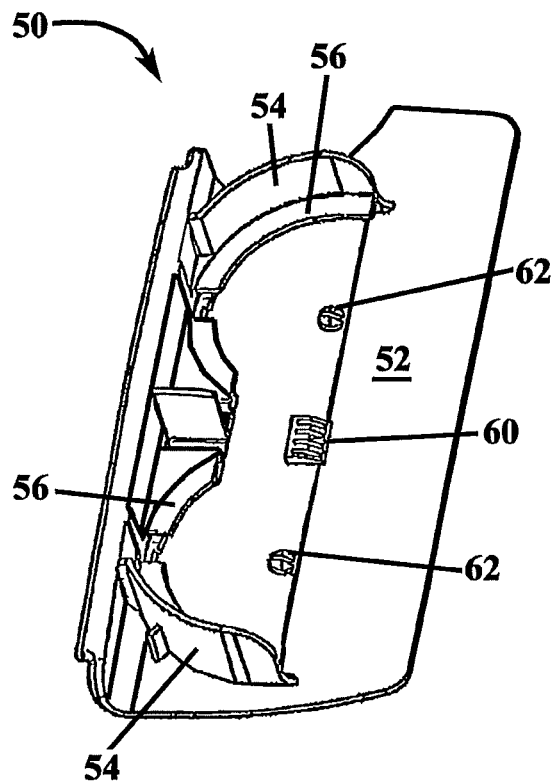
FIG. 12
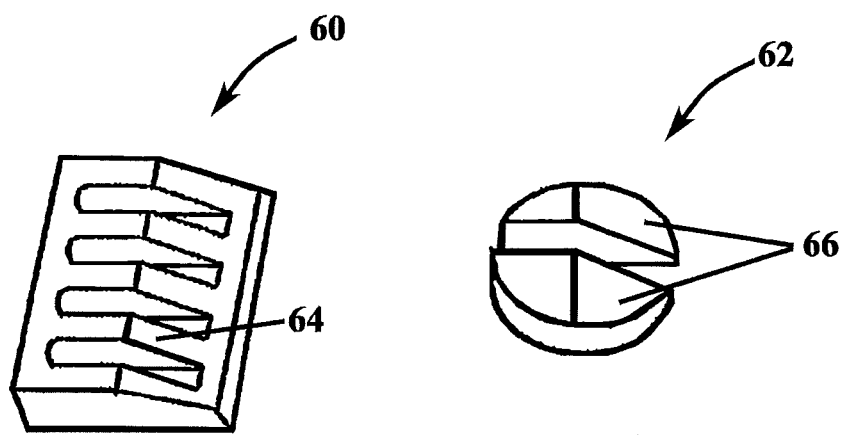
FIG. 13
FIG. 14

DUAL CARTRIDGE FILTER STABILIZER

BACKGROUND OF THE INVENTION

1. Field of the Invention

The present invention relates to a stabilizer for stabilizing cartridges of filtration systems which have at least two adjacent filter cartridges secured in a housing structure, such as a cassette-style filter cartridge assembly.

2. Description of Related Art

A dual filter cartridge assembly is generally shipped with each filter cartridge installed within a filter cartridge housing. The assembly includes a top cover connector plate and a bottom cover plate, which are ultimately used to secure the filter cartridges to a manifold, and partially aid in stabilizing the cartridge filter housings from vibration, shock, and other rotational or linear forces during shipment, storage, and installation. During shipment, it is not uncommon for the filter cartridge housings to dislodge from one of the cover plates, and expose the cartridges to external forces. Furthermore, the elongated dimensional aspects of cassette filter cartridges make the assembly more prone to rotational and twisting forces at each end.

A dual filter cartridge depicting a cassette-style filter assembly according to the prior art is shown in FIG. 1. The dual filter cartridge includes a top cover connector plate with inlet and outlet ports in fluid communication with the inlet and outlet ports of a manifold. The manifold receives the dual filter cartridge top cover connector plate, and secures the dual filter cartridge assembly. The bottom portion of each filter cartridge housing is secured by a bottom cover connector plate (not shown). The filter cartridge housing ends, however, are not completely restrained from translational movement relative to one another, and under extraneous vibration forces, translational forces, and rotational forces, the cartridges tend to stress and twist relative to one another. This mechanical degradation may lead to an improper fit or breakage during shipment.

SUMMARY OF THE INVENTION

Bearing in mind the problems and deficiencies of the prior art, it is therefore an object of the present invention to provide a system for stabilizing the filter housings of a filter cartridge system in order to compensate for external vibration, shock, twist, and rotation that may occur during shipment, installation, and normal use.

It is another object of the present invention to provide a stabilizing member for protecting a dual filter cartridge system or assembly from degrading the ingress and egress connections at the filter manifold due to external forces causing vibrations, shock, twisting, and rotation.

It is still another object of the present invention to provide a filter cartridge which will maintain integrity during shipping or handling of a dual filter cartridge assembly.

The above and other objects, which will be apparent to those skilled in the art, are achieved in the present invention which is directed to a filter housing stabilizing system comprising: at least two filter cartridge housing assemblies, each filter cartridge housing assembly having a top end with at least one fluid port, a bottom end, and a lower housing portion; a top cover connector plate attaching the at least two filter cartridge housing assemblies at the top end; a bottom cover connector plate attaching the at least two filter cartridge housing assemblies at the bottom end; a stabilizer in mechanical contact with the at least two filter cartridge housing assemblies lower housing portion, the stabilizer having a locking member for securing the stabilizer to each of the at least two filter cartridge housing assemblies, and presenting sidewalls in mechanical contact with each of the at least two filter cartridge housing assemblies lower housing portion.

The stabilizer sidewall may include concave sides, each sidewall presenting an arcuate contact surface with a respective lower housing portion when the stabilizer is connected to the at least two filter cartridge housing assemblies.

The bottom cover connector plate includes: a housing guide for each of the at least two filter cartridge housing assemblies, the housing guide circumferentially encompasses an arcuate section of the filter cartridge housing assembly lower housing portion; and a projecting lip extending from each of the housing guides.

Each bottom end of the at least two filter cartridge housing assemblies may include an end cap forming a groove for receiving the projecting lip to secure the at least two filter cartridge housing assemblies from substantial axial movement relative to the bottom cover.

The stabilizer has locking members on each side that may be formed from laterally extending legs, for attaching the stabilizer to each of the at least two filter cartridge housing assemblies.

The bottom end cap includes a rim having an indent for receiving the laterally extending legs of the stabilizer.

The indent may include a shaped internal surface and the laterally extending legs each include a complementary shaped mating surface for interlocking the bottom end cap to the stabilizer and restraining rotational motion.

The bottom cover includes first and second protrusions extending axially upwards, the first protrusion centered about the at least two filter cartridge housing assembly lower housing portions and having resiliency to form a snap or friction fit with a center notch in the stabilizer bottom surface, the second protrusion centered axially underneath each of the at least two filter cartridge housing assembly lower housing portions and having resiliency to form a snap or friction fit with a center opening in each housing assembly bottom end cap.

In a second embodiment, the present invention is directed to a dual filter housing stabilizing system comprising: a first and second cylindrical filter cartridge housing, each including a housing lower portion having a rim, a central opening within a bottom surface, and an indent along a portion of the rim; a stabilizer having opposed curved sidewalls complementary to an outer diameter of the first and second filter cartridge housings, respectively, and a base, the base including radially extended legs, each engageable with the filter cartridge housing indent, respectively; and a bottom cover connector plate including a stabilizer locking protrusion engageable with a stabilizer bottom center opening or notch and a filter locking protrusion engageable with each cartridge central opening.

Lands and grooves in the form of teeth may be within a portion of the indent along the rim of the lower portion.

Lands and grooves in the form of teeth may be at the end of each radially extended leg of the stabilizer base for engagement with the teeth within each indent along the rim of each filter cartridge housing lower portion.

The housing lower portion may include a groove adjacent the housing lower portion rim extending partially about the circumference of the housing lower portion, and the bottom cover connector plate includes a pair of housing guides, the housing guides including a radially inward projecting lip corresponding to, and slideably engageable with, the housing lower portion groove when the filter housing is engaged with the bottom cover connector plate.

The stabilizer base's radially extend legs may include a resilient segment engageable with a complementary resilient segment within each filter cartridge housing indent to secure the stabilizer base from rotational movement.

In a third aspect, the present invention is directed to a dual filter housing stabilizing system comprising: a first and second filter cartridge housing, each including a housing lower portion having an end cap forming a rim, an axially located notch on a bottom surface of the end cap, and a radial arcuate notch in the rim; and a stabilizer including opposing concave curved sidewalls and a stabilizer base attached to, or integral with, the sidewalls, a bottom surface having an interlocking notch, the stabilizer base having opposing radially extending legs projecting approximately perpendicularly outwards relative to the sidewalls, the stabilizer base including lands and grooves at a foremost extended portion of each leg for engaging with complementary lands and grooves within the arcuate radial notch in the rim.

In a fourth aspect, the present invention is directed to a stabilizing member for a filter cartridge assembly having two filter housings, each filter housing being cylindrical and having a lower end cap, the stabilizing member comprising: opposing concave sidewall surfaces having substantially the same curvature as the cylindrical filter housings for contacting the cylindrical filter housing curved surfaces; opposing locking members adjacent the bottom of the stabilizing member, the locking members slideably or frictionally engaged to an indent or notch within each lower end cap of the two filter housings.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 8 is a side elevational view of the stabilizing member depicting a sidewall for contacting with the cylindrical filter housing outer surface;

FIG. 9 is a side elevational view of the stabilizing member depicting the sidewall exposed between filter cartridges;

FIG. 10 is a top elevational view of the stabilizing member according to the present invention;

FIG. 11 is a bottom elevational view of the stabilizing member according to the present invention;

FIG. 12 is a perspective view of the bottom cover connector plate depicting the filter mounting side;

FIG. 13 is an exploded top perspective view of the first protrusion disposed on the cover plate according to the present invention;

FIG. 14 is an exploded top perspective view of the second protrusion disposed on the cover plate according to the present invention;

DESCRIPTION OF PREFERRED EMBODIMENT(S)

In describing the preferred embodiment of the present invention, reference will be made herein to FIGS. 2-15 of the drawings in which like numerals refer to like features of the invention.

Figure 1:
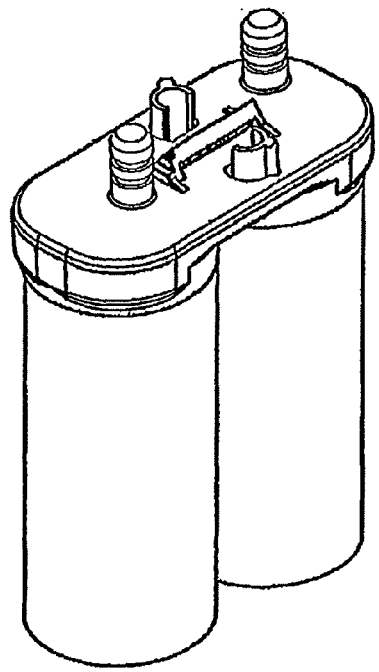
FIG. 1 is a top perspective view of a dual filter cartridge assembly according to the prior art.
Figure 2:
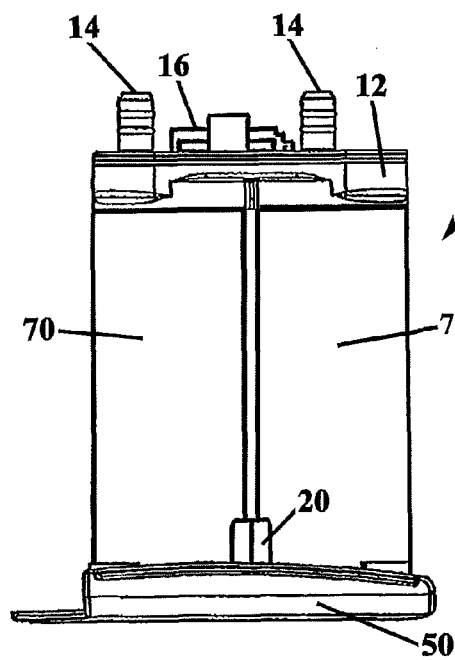
FIG. 2 is a front elevational view of the dual filter cartridge assembly having a stabilizing member, a top cover connector plate, and a bottom cover connector plate according to the present invention.
Figure 3:
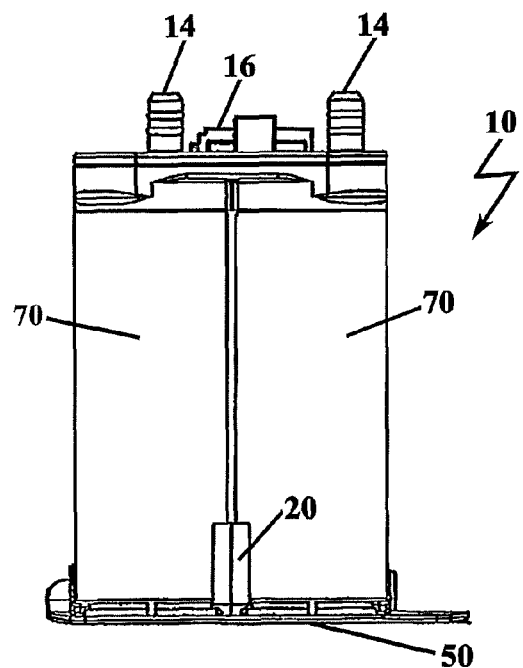
FIG. 3 is a rear elevational view of the dual filter cartridge assembly of FIG. 2.

FIGS. 2 and 3 show the front and rear views of a preferred embodiment of the present invention of a filter assembly 10 that includes assembled dual filter housings 70 in a cassette-style configuration (although other configurations are not precluded, and the present invention is not limited to only a cassette-style configuration), a stabilizer 20, and a cover plate 50. In the preferred embodiment, the filter housings 70 are situated and secured adjacent one another by top and bottom end cover connector plates, forming a cassette-shaped filter assembly.

Each cylindrical housing 70 encloses individual filter cartridges. This dual arrangement of filter cartridges allows for a water filtration apparatus which has the desirable characteristics of utilizing thin-walled, hollow, cylindrical filters in a compact configuration. The filter media may be in the form of extruded carbon, or other media that preferably lends itself to gravity filtration applications. The present apparatus provides for the filter cartridges, collectively as a single cassette filter element or assembly, which can be easily replaced and disposed of with a minimum of mess and water spillage.

In one embodiment, the two filter cartridges are designed to receive water simultaneously. In this respect, they function identically to a single long filter element but acquire the mechanical advantages of a much smaller unit volume. It may be likened to a single element being cut into multiple sections with sections thereafter being operated in "parallel". This is of particular advantage when using solid activated carbon filters, although the present invention is not limited to filter elements having only solid activated carbon filters. Other suitable filter media may be employed as filter elements, such as granulated or particle carbon, and cellulose fiber, to name a few, and the stabilizing function of the present invention will work as well with housing encompassing the different filter media. The different filter media may increase or decrease the housing mass, weight, and inertia, which could adversely affect the stability of the structure, insomuch as the forces and inertia acting on each filter cartridge are a function of its mass. The stabilizer of the present invention is designed to reduce the vibration and twisting of filter housings that may include a variety of filter media.

Referring to FIG. 2, the cartridges are secured together in the form of a cassette filter. Filter cartridge assembly 10 includes a top cover connector plate 12 with ingress and egress bayonet ports 14 for mating with complementary receptacles on a manifold (not shown), and locking feature 16 for securing to the manifold. When connected to the manifold, the ingress and egress bayonet ports 14 are in fluid communication with the complementary ingress and egress ports of the manifold. The filter media for each filter cartridge is enclosed within cylindrical housings 70. The placement of the two cylindrical housings 70, which extend longitudinally from a top cover connector plate 12, contributes to the unwanted vibrational forces and torques acting on the filter cartridges. As depicted in FIG. 2, stabilizer 20 is located between filter housings 70 proximate the bottom portion of each cartridge housing. Stabilizer 20 is designed to mitigate the external forces acting on the housings during shipment, installation, and operation, by restraining movement of each housing relative to one another and relative to the connector plates.

As shown in FIG. 2, an exposed sidewall of stabilizer 20 extends partially along each filter housing in the axial direction, exposing a planar surface that may be partially covered by a contoured curvature of bottom cover connector plate 50 if a curved connector plate design is implemented.

FIG. 3 depicts the rear view of stabilizer 20 within the dual cartridge cassette configuration. Since stabilizer 20 is preferably symmetric, a rear exposed sidewall of stabilizer 20 extends partially along the backside of each filter housing, exposing a planar surface as well. In at least one embodiment, bottom cover connector plate 50 does not obstruct the view of the rearward planar surface of stabilizer 20 as it does on the front side of the filter.

Figure 4:
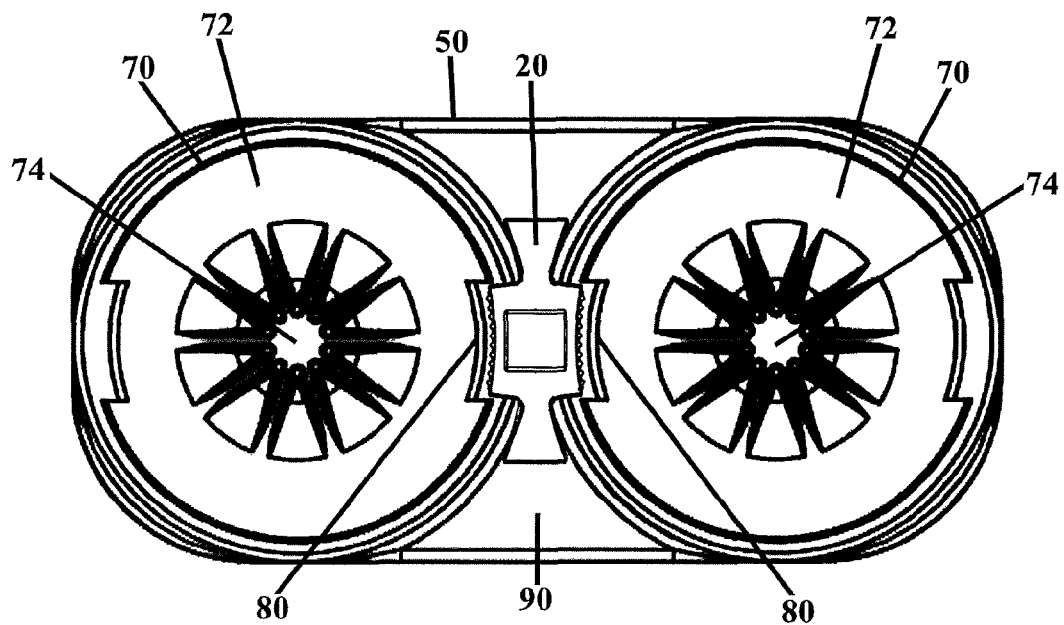
FIG. 4 is a transparent bottom perspective view of the bottom cover connector plate depicting the placement of the stabilizing member according to the present invention.

FIG. 4 is a transparent bottom perspective view of the bottom cover connector plate 50 depicting the placement of stabilizer or stabilizing member 20 between filter cartridge cylindrical housings 70. Stabilizer 20 is shown inserted within indents or notches 80 on the outer periphery of each housing bottom end cap 72. As discussed further herein, the lateral or radial mating surfaces of stabilizer 20 mate within notch 84 of housing bottom end cap 72, effectively locking stabilizer 20 to each filter cartridge cylindrical housing 70, which promotes stability from rotational twisting and translation of each filter cartridge housing about their individual longitudinal axis.

Figure 5:
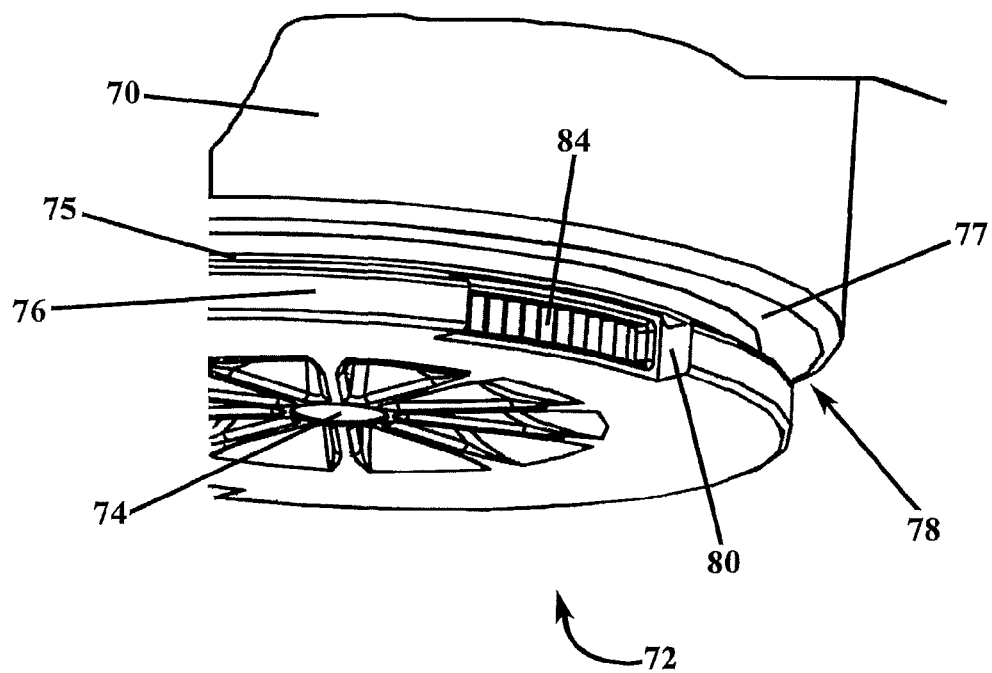
FIG. 5 is an enlarged perspective view of a portion of a cartridge filter housing bottom end according to the present invention.

FIG. 5 is an exploded partial view of the filter cartridge housing bottom portion. A housing end cap 72 may be attached to, or integrally formed with, housing 70. Housing end cap 72 forms a rim 76 that extends along the housing cap periphery. Housing end cap 72 extends below housing 70 such that a groove 78 is formed between the bottom portion 77 of housing 70 and top outer portion 75 of rim 76. Indent 80 is formed within the outer periphery of rim 76. Indent 80 has an arc length that corresponds to the stabilizer base or locking member 22 arc length, such that stabilizer base 22 fits snug within indent 80. This snug fit may be a tight frictional fit. The stabilizer base 22 may also be snap fit into indent 80; the radial walls of indent 80 and/or the radial walls of stabilizer base 22 being sufficiently resilient to allow for a compression or snap fit installation.

Stabilizer 20 is slideably inserted within indent 80. The opposing radially extending legs 23a,b of stabilizer base 22 are slid into the respective indents 80 of each filter cartridge housing rim 76 for mating and securing stabilizer 20 to each housing. The inside arcuate surface of indent 80 preferably includes lands and grooves in the form of teeth 84 or a knurled surface extending radially outwards which is designed to mate with a complementary row of teeth 24 or knurled surface on the opposing mating surface of stabilizer base 22. Opposing indents 80 may also include a resilient segment, such as a rubber tab, extending radially outwards to make contact with the inserted, opposing mating surface of stabilizer base 22, which may or may not include a complementary resilient segment. The purpose of interlocking teeth or high friction surfaces is to reduce rotational movement and torque acting on the cylindrical filter housings by restraining the housing bottom ends from movement relative to one another.

Figure 6:
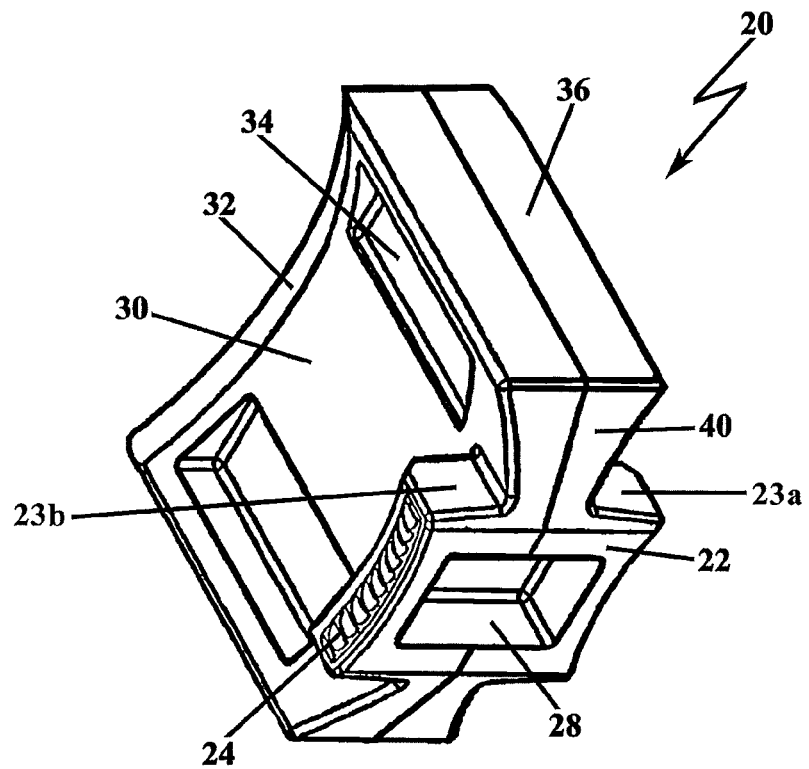
FIG. 6 is a bottom perspective view of the stabilizing member according to the present invention.
Figure 7:
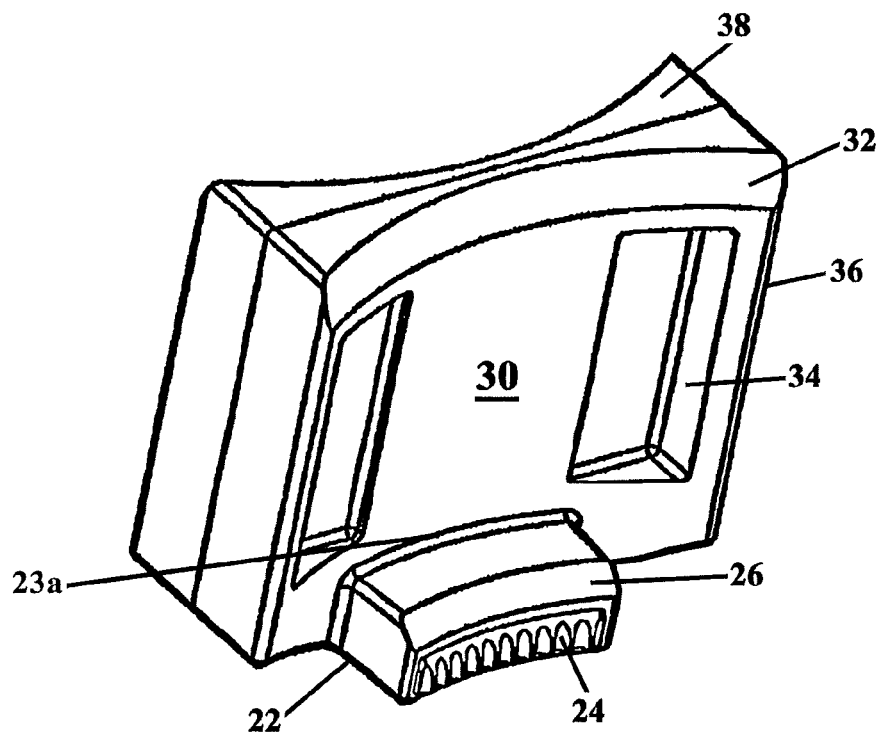
FIG. 7 is a top perspective view of the stabilizing member according to the present invention.

Stabilizer 20 is shown in greater detail in FIGS. 6-11. FIG. 6 is a bottom perspective view of the stabilizer 20 according to the present invention. FIG. 7 is a top perspective view of the stabilizer according to the present invention. Stabilizer 20 includes opposing curved surfaces 30 which correspond with, and approximately follow the curvature of, the outer diameter of the cylindrical housings 70. The curved surfaces form a concave shape for the stabilizer, and allow each housing 70 to follow the curvature of, and fit substantially against, the curved surface 30 of stabilizer 20, such that the curved surfaces 30 of stabilizer 20 are sandwiched between housings 70. The curved surfaces 30 may include formed side indents 34 to reduce the weight of the component.

As noted above, stabilizer 20 includes a stabilizer base or locking member 22 along a bottom portion of each opposing concave curved surface 30. Locking member 22 includes radially or laterally extending legs 23a,b having one or more interlocking features, such as lands and grooves 24 which are engageable with the complementary structures, such as lands and grooves 84 within on rim 76 of the filter housing bottom end cap 72.

Stabilizer 20 preferably includes a center notch 28 within the bottom surface of locking member 22 which forms a slidably, snap-in locking function with a complementary center protrusion 60 on bottom cover connector plate 50. Once center notch 28 is secured to protrusion 60, stabilizer 20 is held in place to bottom cover connector plate 50 from lateral movement. In a similar locking fashion, a second protrusion 62 is located on each side of protrusion 60, with all three protrusions inline on bottom cover connector plate 50. Second protrusions 62 form a snap or compressed fit with central openings 74 (FIG. 4) located on the bottom of each filter housing 70 at each housing's axial center.

The upper surface 38 and lower surface 40 of stabilizer 20 are each shown with a bevel 32, although other edge terminations may be employed.

FIG. 8 is a side elevational view of the stabilizing member or stabilizer 20 depicting the sidewall 30 which contacts with the filter housing outer surface. Locking member 22 includes radially or laterally extended legs 23a,b, and preferably includes a lock member chamfer 26 along a top surface of each extended leg 23a,b aiding the engagement of locking member 22 and filter housing rim indent 80. As described above, although indent lands and grooves 84 within the filter housing rim indent 80 and complementary lands and grooves 24 on each extended leg 23a,b at its foremost extended portion, engage to provide additional restraint against torque and rotational forces, the indent lands and grooves (or teeth) 84 and locking member lands and grooves (or teeth) 24 may be replaced with snaps or with high friction surfaces for restraining housing rotation and preventing damage from vibration, impact, or any other mechanical forces.

FIG. 9 is a side elevational view of the stabilizing member depicting the sidewall 36 exposed between filter cartridge housings when stabilizer 20 is inserted. The curvature of stabilizer 20 forms a wedge 40 formed by opposing edges of the curved surfaces 30. This forms the concave nature of stabilizer 20. FIG. 10 is a top elevational view of the stabilizing member according to the present invention. Concave curved surfaces 30 follow the curvature of filter cartridge housings 70 and extend beyond the housings so that side 36 is exposed on each side of the assembly. Wedge 40 is depicted having a tapered bottom extending outwardly and upwardly from the bottom of locking member 22, although a straight-edge surface is not precluded and could be implemented by the present invention.

FIG. 11 is a bottom elevational view of the stabilizing member according to the present invention. Center notch 78 is prominently depicted for locking the stabilizer, and thereby the filter cartridge assembly, in place.

FIG. 12 depicts a perspective view of the bottom cover connector plate 50 which includes a cover shell 52 and housing guides 54. Housing guides 54 are shown with an inwardly projecting lip 56 which is designed to fit within filter housing cap groove 78 when the filter housings 70 are slideably engaged with bottom cover connector plate 50. The housings 70 are slidably insertable within lip 56, and held in place by the snap or friction fit of protrusions 60, 62 within center notch 28 at the bottom of stabilizer 20, and central openings 74 located on the bottom of each filter housing 70 at each housing's axial center. As shown in greater detail in FIGS. 13 and 14, the first protrusion 60 includes a sloped portion 64 which engages center notch 28 in a resilient locking fashion when filter housing bottom end cap 72 is slideably inserted toward housing guides 54. Inwardly projecting lip 56 engages the filter housing lower portion groove 78, while first protrusion 60 is simultaneously engaging stabilizer center notch 28. The second protrusions 62 also include a sloped portion 66 which resiliently engage central opening 74 located on the bottom of each filter housing 70 at each housing's axial center. Thus, when filter housing bottom end cap 72 is pushed toward housing guides 54, the inwardly projecting lip 56 engages the filter housing lower portion groove 78 and the second protrusions 62 engage the central openings 74 of each housing, while the first protrusion 60 simultaneously engages the center notch 28, thus locking the filter housings to the bottom cover connector plate 50.

Figure 15:
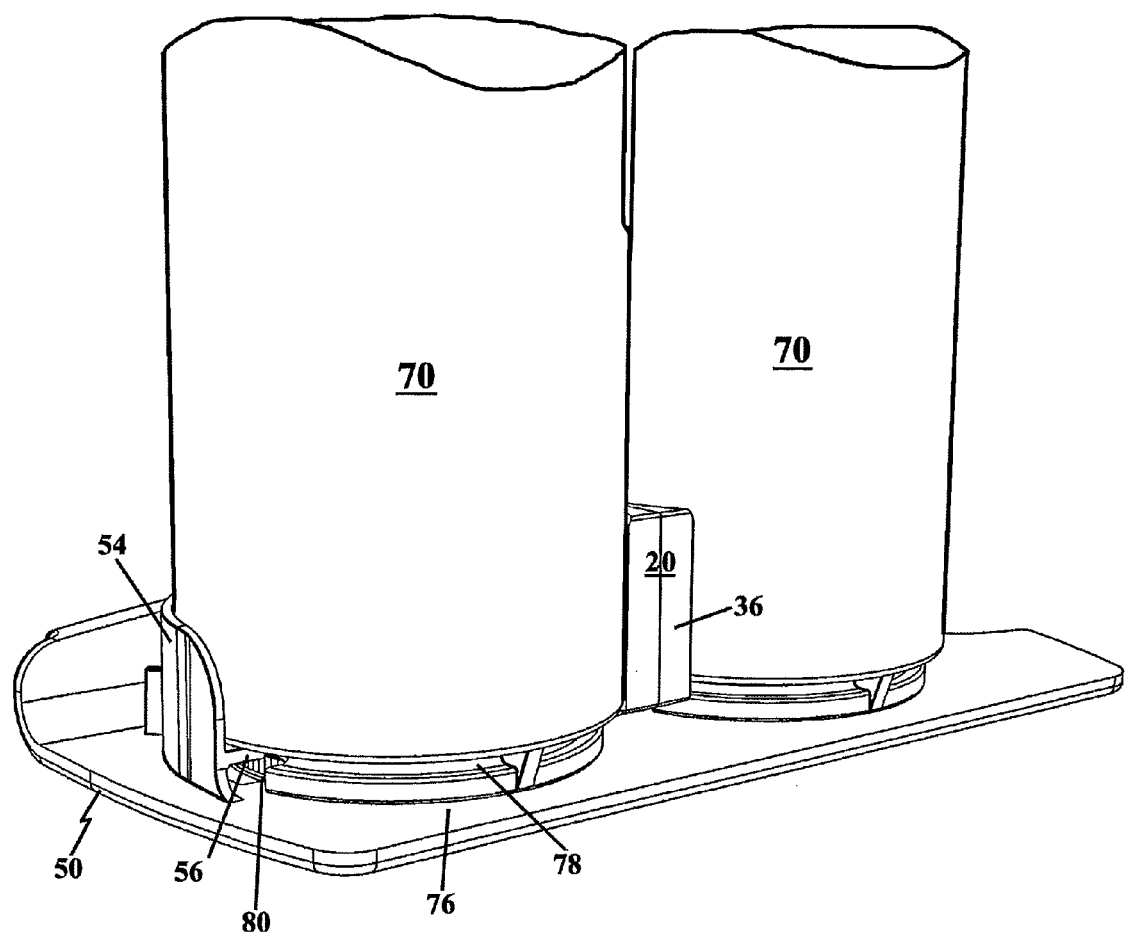
FIG. 15 depicts a backside perspective view of the bottom cover connector plate with filter cartridge housings attached.

FIG. 15 depicts a backside perspective view of the bottom cover connector plate 50 with filter cartridge housings 70 attached. Lip 56 of bottom cover connector plate 50 is depicted inserted within groove 78 of filter housing 70. Stabilizer 20 is secured between the filter cartridge housings 70 with sidewall surface 36 exposed.

Each filter cartridge is assembled using a manifold, base unit, and a filter housing with a carbon member filter element inside. Generally, the addition of a bottom cover connector plate when paired with a label and box, define the final model of the filter element. Prior to this, cover plates were slid into place as one of the last steps prior to packaging. In a preferred embodiment, the stabilizer is put in place prior to shipment so that it affords a subassembly level of protection during shipping.

The stabilizer positions the housings to receive the bottom cover connector plate. The bottom cover connector plate is guided and slid into the corresponding tongue and groove features formed by the housing end cap 78 and the cover lip 56. The first and second projections snap firmly into position with the housing and stabilizer complementary attachments.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A filter housing stabilizing system comprising:
   at least two filter cartridge housing assemblies, each filter cartridge housing assembly having a top end with at least one fluid port, a bottom end, and a lower housing portion;
   a top cover connector plate attaching said at least two filter cartridge housing assemblies at said top end;
   a bottom cover connector plate having an outer circumferential edge, and covering each axial end of said lower housing portions;
   a housing guide attaching each filter cartridge housing assembly, said housing guide attached to or integral with said bottom cover connector plate, and circumferentially encompassing an arcuate section of each of said filter cartridge housing assemblies, wherein said outer circumferential edge of the bottom cover connector plate extends beyond said housing guide; and
   a stabilizer in mechanical contact with said at least two filter cartridge housing assemblies, said stabilizer presenting sidewalls for attachment with each of said at least two filter cartridge housing assemblies, and presenting opposing free sides without locking members, said opposing free sides having a distance therebetween, such that the distance between said opposing free sides is no greater than either diameter of said at least two filter cartridge housing assemblies.

2. The filter housing stabilizing system of claim 1 wherein said stabilizer sidewall includes concave sides, each sidewall presenting an arcuate contact surface with a respective lower housing portion when said stabilizer is connected to said at least two filter cartridge housing assemblies.

3. The filter housing stabilizing system of claim 1 wherein said housing guide for said at least two filter cartridge housing assemblies and said filter cartridge housing assembly lower housing portions form a tongue and groove attachment to secure said at least two filter cartridge housing assemblies to said housing guide.

4. The filter housing stabilizing system of claim 3 wherein each bottom end of said at least two filter cartridge housing assemblies includes an end cap forming a groove for receiving a projecting lip extending from said housing guide to secure said at least two filter cartridge housing assemblies from substantial axial movement relative to said bottom cover.

5. The filter housing stabilizing system of claim 2, wherein said stabilizer includes laterally extending legs on each side, forming said locking member for attaching said stabilizer to each of said at least two filter cartridge housing assemblies.

6. The filter housing stabilizing system of claim 5 wherein said bottom end cap includes a rim having an indent for receiving said laterally extending legs of said stabilizer.

7. The filter housing stabilizing system of claim 6 wherein said indent includes a shaped internal surface and said laterally extending legs each include a complementary shaped mating surface for interlocking said bottom end cap to said stabilizer and restraining rotational motion.

8. A filter housing stabilizing system comprising:
   at least two filter cartridge housing assemblies, each filter cartridge housing assembly having a top end with at least one fluid port, a bottom end, and a lower housing portion;
   a top cover connector plate attaching said at least two filter cartridge housing assemblies at said top end;
   a bottom cover connector plate attaching said at least two filter cartridge housing assemblies at said bottom end;

a stabilizer in mechanical contact with said at least two filter cartridge housing assemblies lower housing portion, said stabilizer having a locking member for securing said stabilizer to each of said at least two filter cartridge housing assemblies, and presenting sidewalls in mechanical contact with each of said at least two filter cartridge housing assemblies lower housing portion wherein said bottom cover connector plate includes:

a housing guide for each of said at least two filter cartridge housing assemblies, said housing guide circumferentially encompasses an arcuate section of said filter cartridge housing assembly lower housing portion, a projecting lip extending from each of said housing guides; and first and second protrusions extending axially upwards, said first protrusion centered about said at least two filter cartridge housing assembly lower housing portions and having resiliency to form a snap or friction fit with a center notch in said stabilizer bottom surface, said second protrusion centered axially underneath each of said at least two filter cartridge housing assembly lower housing portions and having resiliency to form a snap or friction fit with a center opening in each housing assembly bottom end cap.

9. A dual filter housing stabilizing system comprising:

a first and second cylindrical filter cartridge housing, each including a housing lower portion having a rim, a central opening within a bottom surface, and an indent along a portion of the rim;

a stabilizer having opposed curved sidewalls complementary to an outer diameter of the first and second filter cartridge housings, respectively, and a base, the base including radially extended legs, each engageable with said filter cartridge housing indent, respectively; and a bottom cover connector plate including a stabilizer locking protrusion engageable with a stabilizer bottom center opening or notch and a filter locking protrusion engageable with each cartridge central opening.

10. The dual filter housing stabilizing system of claim 9 including lands and grooves in the form of teeth within a portion of the indent along the rim of the lower portion.

11. The dual filter housing stabilizing system of claim 10 including lands and grooves in the form of teeth at the end of each radially extended leg of said stabilizer base for engagement with the teeth within each indent along the rim of each filter cartridge housing lower portion.

12. The dual filter housing stabilizing system of claim 9 wherein the housing lower portion includes a groove adjacent the housing lower portion rim extending partially about the circumference of the housing lower portion, and the bottom cover connector plate includes a pair of housing guides, the housing guides including a radially inward projecting lip corresponding to, and slideably engageable with, the housing lower portion groove when the filter housing is engaged with the bottom cover connector plate.

13. The dual filter housing stabilizing system of claim 9 wherein said stabilizer base radially extend legs include a resilient segment engageable with a complementary resilient segment within each filter cartridge housing indent to secure said stabilizer base from rotational movement.

14. A dual filter housing stabilizing system comprising:

a first and second filter cartridge housing, each including a housing lower portion having an end cap forming a rim, an axially located notch on a bottom surface of said end cap, and a radial arcuate notch in said rim;

a stabilizer including opposing concave curved sidewalls and a stabilizer base attached to, or integral with, said sidewalls, a bottom surface having an interlocking notch, the stabilizer base having opposing radially extending legs projecting approximately perpendicularly outwards relative to said sidewalls, said stabilizer base including lands and grooves at a foremost extended portion of each leg for engaging with complementary lands and grooves within the arcuate radial notch in said rim; and a bottom cover plate connector including a stabilizer locking protrusion engageable with the stabilizer notch and a first and second filter locking protrusion engageable with the radial notch of said first and second filter cartridge housing, respectively.

* * * * *